April 25, 1961 R. N. NOYCE 2,981,877

SEMICONDUCTOR DEVICE-AND-LEAD STRUCTURE

Filed July 30, 1959 3 Sheets-Sheet 1

INVENTOR.
ROBERT N. NOYCE
BY Lippincott & Ralls
ATTORNEYS

SEMICONDUCTOR DEVICE-AND-LEAD STRUCTURE

Filed July 30, 1959 3 Sheets-Sheet 2

INVENTOR.
ROBERT N. NOYCE
BY Lippincott & Ralls
ATTORNEYS

April 25, 1961 R. N. NOYCE 2,981,877

SEMICONDUCTOR DEVICE-AND-LEAD STRUCTURE

Filed July 30, 1959 3 Sheets-Sheet 3

INVENTOR.
ROBERT N. NOYCE
BY Lippincott & Ralls
ATTORNEYS

2,981,877

SEMICONDUCTOR DEVICE-AND-LEAD STRUCTURE

Robert N. Noyce, Los Altos, Calif., assignor to Fairchild Semiconductor Corporation, Mountain View, Calif., a corporation of Delaware Filed July 30, 1959, Ser. No. 830,507

10 Claims. (Cl. 317—235)

This invention relates to electrical circuit structures incorporating semiconductor devices. Its principal objects are these: to provide improved device-and-lead structures for making electrical connections to the various semiconductor regions; to make unitary circuit structures more compact and more easily fabricated in small sizes than has heretofore been feasible; and to facilitate the inclusion of numerous semiconductor devices within a single body of material.

In brief, the present invention utilizes dished junctions extending to the surface of a body of extrinsic semiconductor, an insulating surface layer consisting essentially of oxide of the same semiconductor extending across the junctions, and leads in the form of vacuum-deposited or otherwise formed metal strips extending over and adherent to the insulating oxide layer for making electrical connections to and between various regions of the semiconductor body without shorting the junctions.

The invention may be better understood from the following illustrative description and the accompanying drawings.

Fig. 1 of the drawings is a greatly enlarged plan view of a transistor-and-lead structure embodying principles of this invention;

Figure 1:
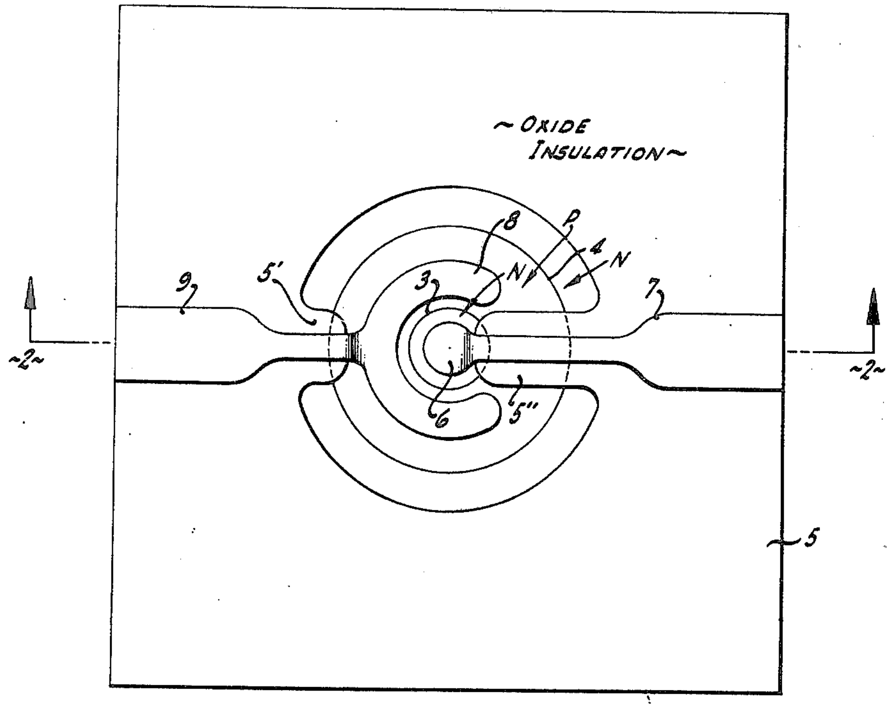
Figure 2:
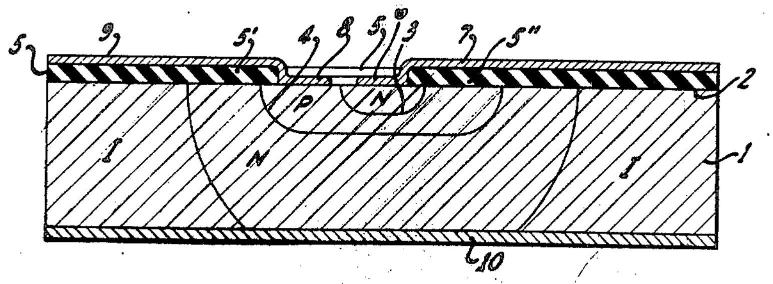
Fig. 2 is a section taken along the line 2—2 of Fig. 1.

Figs. 1 and 2 illustrate one example of a structure according to this invention. A single-crystal body of semiconductor-grade silicon, represented at 1, has a high-quality surface 2, prepared in accordance with known transistor technology. Within the body 1 there are high-resistivity regions, designated I in the drawing, composed either of high-purity silicon having so few donor and acceptor impurities that it is a good insulator at ordinary temperatures and an intrinsic semiconductor at elevated temperatures, or of somewhat less-pure silicon containing a trace of a material such as gold that diminishes the effect of donor and acceptor impurities by greatly reducing the carrier concentrations.

Elsewhere within body 1, there are extrinsic N-type and extrinsic P-type regions, designated N and P respectively, formed in the well-known manner by diffusing N-type and P-type dopants through surface 2 into the crystal, with appropriate masking to limit the dopant to the desired areas. The smallest and uppermost N-type region constitutes an emitter layer of the transistor. This emitter layer overlies a somewhat larger P-type region which constitutes the base layer of the transistor. The base layer, in turn, overlies a still larger N-type region which constitutes the collector layer of the transistor. Between the emitter and base layers there is a dished, P–N junction 3, having a circular edge which extends to surface 2 and there completely surrounds the emitter. Between the base and collector layers there is a dished, P–N junction 4, having a circular edge that extends to surface 2 and there completely surrounds the base. The thickness of the emitter and base layers has been exaggerated in the drawings: in actual practice each of these layers is but a few microns thick. The collector layer generally is considerably thicker, and in the example illustrated extends completely through the body 1 so that contact thereto may be made from the back side. Thus, the three extrinsic semiconductor layers described form a transistor equivalent to previously known types of double-diffused junction transistors.

During diffusion of the donor and acceptor impurities into the semiconductor, at elevated temperature in an oxidizing atmosphere, the surface of the silicon oxidizes and forms an oxide layer 5, often one micron or more in thickness, congenitally united with and covering surface 2. This layer may consist chiefly of silicon dioxide, or of disproportionated silicon suboxide, depending upon the temperature and conditions of formation. In any event, the oxide surface layer is durable and firmly adherent to the semiconductor body, and furthermore it is a good electrical insulator.

According to common prior practice in manufacturing diffused-junction transistors, the semiconductor body was deoxidized by chemical etching prior to deposition of metal contacts on the semiconductor surface. According to the present invention, only selected portions of the oxide layer are removed, as illustrated in Figs. 1 and 2, for example, while other portions of the oxide layer are left in place to serve as insulation for electrical leads used in making connections to and between the several semiconductor regions.

In particular, portions of the remaining oxide film extend across the edges of the P–N junctions at the surface of the semiconductor body, to facilitate the making of electrical connections from one side of a junction to another without shorting the junction. Thus, as illustrated in Figs. 1 and 2, the remaining oxide film comprises a tongue 5′ that crosses the edge of junction 4, and another tongue 5″ that crosses the edges of both junctions 3 and 4. On the other hand, at least a portion of the surface over each of the emitter and base layers must be cleared to permit the formation of base and emitter contacts.

A convenient and highly accurate way to remove only selected portions of the oxide film is to use photoengraving techniques. The photoengraving resist is placed over the oxide-coated surface, and this is then exposed through a master photographic plate having opaque areas corresponding to the areas from which the oxide is to be removed. In the usual photographic developing, the unexposed resist is removed; and chemical etching can then be employed to remove the oxide layer from the unexposed areas, while the exposed and developed resist serves as a mask to prevent chemical etching of the oxide areas that are to be left on the semiconductor surface.

A discoid, metal, emitter contact 6 is adherent to surface 2, wholly within the edge of junction 3, centered upon and in electrical connection with the emitter region of the transistor. Electrical connections to this emitter contact are made through a metal strip 7 extending over and adherent to oxide layer 5. The strip 7 extends over the tongue 5″ of the insulating oxide layer across the junctions 3 and 4, and thus provides an electrical connection extending from one side of the composite structure inward to the central emitter contact, without shorting any of the transistor junctions.

The base contact is a C-shaped, metal strip 8, adherent to surface 2 wholly between the edges of junctions 3 and 4, substantially concentric with the emitter contact 6 and substantially encircling the junction 3. It will be noted that tongue 5'' and lead 7 extend between the two ends of the C-shaped contact 8, so that lead 7 and the emitter contact are effectively insulated from the base contact even though the base contact substantially surrounds the emitter junction. Electrical connection to contact 8 is made through a metal strip 9 extending over and adherent to the insulating oxide layer 5. Strip 9 extends over tongue 5' across the collector junction 4, and thus provides an electrical connection from one side of the composite structure into the base layer, which in this embodiment is completely surrounded by the collector layer at the surface 2, without shorting the collector junction 4.

Various methods may be employed for forming the base and emitter contacts and leads. By way of example, the contacts and leads can be deposited in the configuration shown by direct vacuum evaporation of aluminum, or other suitable contact metal, through a mask of suitable size and shape. Alternatively, a metal coating may be deposited over the entire upper surface of the composite structure, and the unwanted metal then removed by known photoengraving techniques to leave only the contact-and-lead configuration shown. After the contacts have been deposited upon surface 2 of the semiconductor, the structure is usually heated to form an alloy at the metal-silicon interface so that good, ohmic contact between the metal and the silicon is obtained.

It will be noted that regions of high-resistivity silicon are made to underlie portions of the leads 7 and 9. The principal purpose in this is to reduce the shunt capacitance between the leads and the semiconductor body. Otherwise, an undesirably high shunt capacitance may exist in some cases since the extrinsic semiconductor regions are fairly good conductors, and the insulating layer 5 has a thickness of only one to two microns. The high-resistivity regions act essentially as insulators rather than as conductors, and thus reduce the area of closely spaced conductors that lead to high shunt capacitances. Of course, in cases where the shunt capacitance is not excessive for the purposes desired, use of high-resistivity regions as disclosed is not required.

The transistor structure is completed by an electrical contact to the collector layer, which may take the form of a metal coating 10 plated over the entire back side of the silicon body.

Even in a single transistor, as illustrated in Figs. 1 and 2, the composite semiconductor-and-lead structure provided by this invention has significant advantages. According to prior practice, electrical connection to the base and emitter contacts had to be made by fastening wires directly to the contact areas. This led to certain manufacturing difficulties, particularly in the case of small devices wherein, for example, the emitter region might be only a few mils in diameter and a few microns in thickness. Merely to position the emitter lead on the emitter contact in such small structures required the use of microscopes and micro-manipulators; and the use of any considerable pressure or considerable heat in making the joint permanent could cause sufficient damage to destroy the transistor.

By means of the present invention, the leads 7 and 9 can be deposited at the same time and in the same manner as the contacts themselves. Furthermore, leads 7 and 9 can be made as large as may be desired at the point where wires or other external circuit elements are to be attached; and such attachments can be made at a distance from the active elements of the transistor proper, so that the chances of damage to the transistor are significantly reduced.

Further advantages accrue when it is desired to incorporate more than one circuit device into a single body of semiconductor. In this way exceptionally compact and rugged circuits can be constructed. One example of such a multi-device structure is illustrated in Figs. 3 and 4.

A single-crystal body 11 of silicon, largely P-type, has a high-quality surface 12 prepared in accordance with well known transistor technology. The other side of body 11 is plated with a metal coating 13, which serves as an electrical contact to the largest P-type region and as a ground plane for the electrical circuit. Various circuit elements may be formed within and on this body of silicon. N-type and P-type dopants, restricted to specific areas by known masking techniques, are diffused through surface 12 to form a plurality of N-type and P-type extrinsic semiconductor regions, separated from the underlying P-type region and from each other by a plurality of dished, P–N junctions of various diameters and depths, all having, in this particular example, circular edges extending to surface 12 and there surrounding the overlying semiconductor regions.

Figure 3:
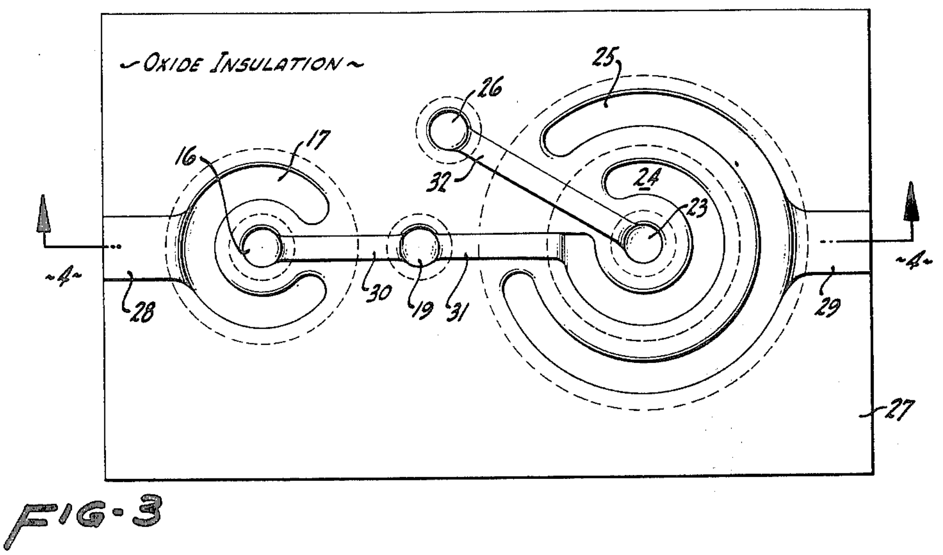
Fig. 3 is a greatly enlarged plan view of a multi-device semiconductor-and-lead structure embodying principles of this invention.
Figure 4:
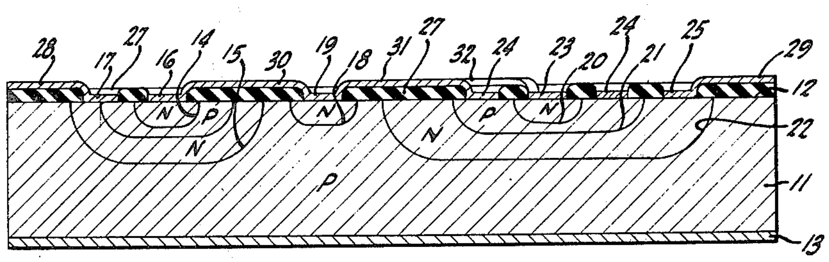
Fig. 4 is a section taken along the line 4—4 of Fig. 3.

Toward the left end of the structure illustrated in Figs. 3 and 4, there will be found an N-type region overlying a small P-type region and separated therefrom by a dished junction 14. The small P-type region overlies another N-type region; and the underlying N-type region in turn overlies the large, grounded P-type region and is separated therefrom by a dished junction 15. The junction between the two intermediate layers is shorted by contact 17. Consequently, this structure provides two rectifying junctions connected in series, each equivalent to a crystal diode.

Electrical connection to the upper N-type region is made through a discoid, metal contact 16, adherent to surface 12, wholly within junction 14 and substantially centered upon the N-type region. Electrical contact to the two regions between junctions 14 and 15 is made through a C-shaped metal contact 17, adherent to surface 12, wholly between the edges of junctions 14 and 15, concentric with contact 16 and substantially encircling the edge of junction 14, which extends to the surface 12.

Proceeding toward the right in the drawings, there will be found another N-type region, separated from the underlying, grounded, P-type region by a dished junction 18. Electrical connection to the N-type region in this case is made through a discoid, metal contact 19, adherent to surface 12 and substantially centered inside the edge of junction 18, which extends to the surface of the semiconductor.

Toward the right end of the structure illustrated, there will be found a small N-type region overlying a P-type region and separated therefrom by a dished junction 20. The last-mentioned P-type region in turn overlies a larger N-type region and is separated therefrom by a dished junction 21. The N-type region below junction 21 in turn overlies the grounded P-type region and is separated therefrom by a dished junction 22. In this case, the width of the P-type region between junctions 20 and 21 is less than a diffusion length, so that a substantial proportion of the electrons that cross junction 20 are collected by junction 21. The result is an N-P-N junction transistor, in which the small N-type region overlying junction 20 acts as the emitter, the P-type region between junctions 20 and 21 acts as the base, and the N-type region between junctions 21 and 22 acts as the collector. The width of the last-menttioned N-type region is greater than a diffusion length, and consequently there is little interaction between junctions 21 and 22. As will be explained hereinafter, junction 22 is normally reverse-biased and acts much as a capacitor in the overall circuit. It serves the important function of isolating the collector of the transistor from the grounded, underlying, P-type region.

Electrical connections to the three active regions of the transistor are made as follows: A discoid, metal contact 23 is adherent to surface 12, wholly within the edge of junction 20, centered upon and in electrical connection with the emitter layer of the transistor. A C-shaped contact 24 is a metal strip adherent to surface 12 between junctions 20 and 21, substantially surrounding the circular edge of junction 20 that extends to the surface of the semiconductor body. This contact overlies and is in electrical connection with the base layer of the transistor. Another and larger C-shaped contact 25, which overlies and is in electrical connection with the collector layer, is likewise in the form of a metal strip, adherent to surface 12 between junctions 21 and 22, and surrounding the circular edge of collector junction 21 that extends to the surface.

Still another contact is provided upon and adherent to surface 12. This is the discoid, metal contact 26, directly upon and in electrical connection with the grounded P-type layer, for the purpose of providing a ground terminal at the upper surface of the composite structure.

Except for the contacts described above, the entire surface 12 is covered with an insulating layer 27 of oxidized silicon, generally about one micron thick. This insulating layer may be formed upon the exposed surface of the silicon during diffusion of the N-type and P-type dopants into the silicon, at elevated temperatures and in an oxidizing atmosphere. The presence of water vapor will enhance oxidation of the silicon. Preferably, in accordance with this invention and contrary to prior practice, after diffusion is completed the oxide layer is never removed from the silicon, except for the areas to be covered by the contacts herein described. The contact areas are cleared by photoengraving, after which the contact metal can be deposited by various known processes, e.g., by the vacuum deposition of an aluminum film covering both the cleared and oxide-coated areas. Afterwards, unwanted metal can be removed from the oxide-coated areas by photoengraving. The aluminum contacts may be alloyed to the silicon to make ohmic contacts in a known manner.

The circuit structure is completed by providing metal strips extending over and adherent to the insulating oxide layer 27 and making electrical connections to and between the various contacts heretofore described. These metal strips may be deposited by vacuum evaporation and deposition, and may conveniently be parts of the deposited film from which contacts are made. The leads come from portions of the film that are deposited onto the oxide film and are thereby insulated from the semiconductor body. As hereinbefore explained, photoengraving can be used to remove the unwanted metal, leaving only the leads and contacts.

In the structure illustrated, there is an input lead 28 electrically connected to contact 17, and an output lead 29 electrically connected to contact 25. A lead 30 interconnects contacts 16 and 19; if desired, lead 30 can be made sufficiently thin and narrow to have an appreciable resistance, and thereby serve as a resistance element in the circuit. A similar lead 31 interconnects contacts 19 and 24, and still another lead 32, which may be made to have an appreciable resistance if desired, interconnects contacts 23 and 26.

Figure 5:
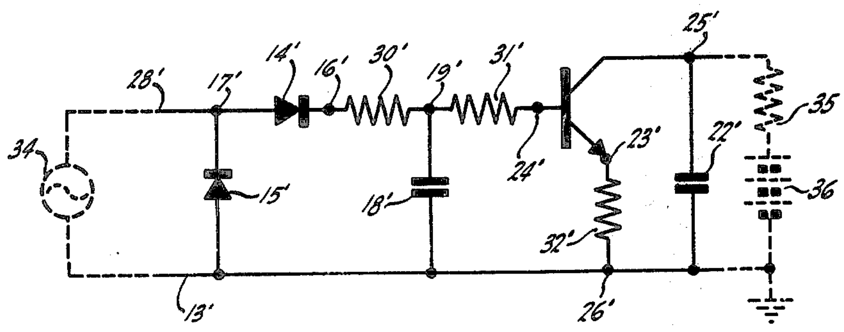
Fig. 5 is a simplified equivalent circuit of the structure shown in Figs. 3 and 4, with additional circuit elements external to said structure represented by broken lines.

The solid lines in Fig. 5 represent the simplified, equivalent circuit for the structure shown in Figs. 3 and 4, while the broken lines in Fig. 5 represent typical external circuit components added for purposes of explanation. The solid-line parts are identified by reference numbers identical to the reference numbers of corresponding parts in the structure of Figs. 3 and 4, with the addition of a prime to the reference numbers in Fig. 5.

Any desired source of an amplitude-modulated, A.-C. signal is represented at 34 in Fig. 5. This A.-C. signal is applied between the input lead 28′ and the ground connection 13′, corresponding to lead 28 and ground plane 13 of the physical structure shown in Figs. 3 and 4. Lead 28 conducts the signal through contact 17 into the two layers between junctions 14 and 15. As hereinbefore explained, each of the junctions 14 and 15 performs essentially the functions of a crystal diode rectifier, as schematically represented at 14′ and 15′, Fig. 5.

Thus, as is evident from the equivalent circuit shown in Fig. 5, the input signal is rectified or detected by the junctions 14 and 15, to provide at contact 16 a signal essentially corresponding to the modulation envelope of the input signal. Because of its appreciable resistance, lead 30 acts as a circuit resistor, represented in Fig. 5 as 30′. It will be noted that the polarity of rectifying junctions 14 and 15 is such that the signal supplied to contact 19 has a D.-C. component of the polarity required to reverse-bias junction 18. Hence, the voltage across junction 18 is always in the high-resistance direction of the junction, and there is no appreciable current flow across this junction. However, there are charge layers on both sides of the junction which form a capacitance, as is well known, and therefore the circuit function of junction 18 is to provide a capacitance, represented in Fig. 5 at 18′. The value of this capacitance can be made greater or less, as desired, by increasing or decreasing the area of junction 18.

Lead 31 has an appreciable resistance and therefore acts as a circuit resistor, represented at 31′, Fig. 5. This leads to the base contact 24 of the transistor, shown at 24′ in Fig. 5. The emitter contact of the transistor is connected through lead 32 and contact 26 to the grounded P-type semiconductor region. This is represented in Fig. 5 by the emitter terminal 23′ connected through resistor 32′ to the ground line 13′. The value of the resistor 32′ is the sum of the resistances of contacts 23 and 26, lead 32, and the current path through the P-type layer between contact 26 and ground plane 13.

Normal operation of the N–P–N transistor requires that the N-type collector be supplied with a relatively positive voltage, as is accomplished in the equivalent circuit illustrated in Fig. 5 by the external voltage supply 36 connected to the collector terminal 25′ through any appropriate load 35. It is evident that this supply voltage reverse-biases junction 22, and therefore, for reasons already explained, the junction 22 acts essentially as a capacitor, represented at 22′ of the equivalent circuit shown in Fig. 5.

It should now be apparent that the structure shown in Figs. 3 and 4 comprises, within a single, rugged, compact unit, detector, filtering, and transistor-amplifier stages. It is believed to be evident that the principles of this invention make feasible the construction of an endless variety of circuit combinations, including combinations much more elaborate and complex than the simple circuit employed for purposes of illustration, all within a highly compact and rugged, essentially unitary, solid body.

Figure 6:
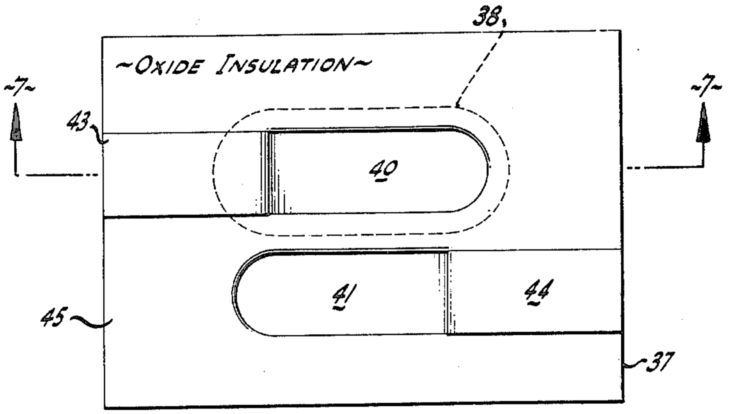
Fig. 6 is a greatly enlarged plan view of another transistor-and-lead structure embodying principles of the invention.
Figure 7:
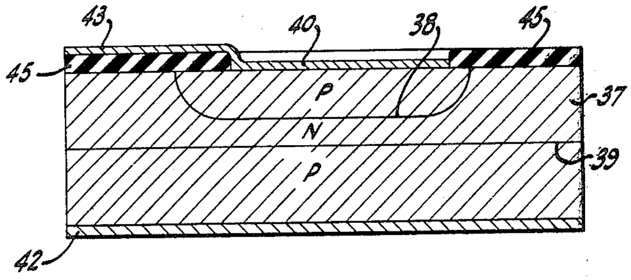
Fig. 7 is a section taken along the line 7—7 of Fig. 6.

Figs. 6 and 7 show an example in which the emitter and base contacts are parallel strips. A single-crystal body 37 of silicon contains a P-type, emitter layer overlying an N-type, base layer and separated therefrom by a dished junction 38, which extends to the upper surface of the semiconductor and there surrounds the P-type, emitter layer. In this case, the edge of junction 38 does not form a circle at the surface, but forms an elongated, closed figure. The N-type, base layer overlies a P-type, collector layer and is separated therefrom by a flat junction 39.

The emitter contact 40 is a straight strip of metal, vacuum-deposited or otherwise placed upon the upper surface of the silicon, and preferably alloyed thereto to form an ohmic contact. The base contact 41 is a similar strip of metal, parallel to contact 40. The edge of junction 38 extends between the two contacts, and around contact 40, as shown. The collector contact 42 may be a metal layer plated onto the bottom surface of the silicon.

Except for the areas covered by contacts 40 and 41, the upper surface of the silicon is covered by an insulating oxide layer, congenitally united with the silicon and actually formed by heating the silicon in an oxidizing atmosphere. The oxide layer completely covers the edge of junction 38, and protects the junction against accidental shorting in addition to providing insulation between the electrical leads and the silicon.

Electrical connection to contact 40 is made by a metal strip 43, extending over and firmly adherent to the oxide layer. Electrical connection to contact 41 is made by a metal strip 44, similarly extending over and firmly adherent to the oxide layer. These metal strips can be formed by vacuum deposition through a mask, or by plating the entire surface and then removing unwanted metal by photoengraving, or by any other method providing metal strips that adhere securely to the oxide surface.

The invention in its broader aspects is not limited to the specific examples illustrated and described. What is claimed is:

1. A semiconductor device comprising a body of semiconductor having a surface, said body containing adjacent P-type and N-type regions with a junction therebetween extending to said surface, two closely spaced contacts a adherent to said surface upon opposite sides of and adjacent to one portion of said junction, an insulating layer consisting essentially of oxide of said semiconductor on and adherent to said surface, said layer extending across a different portion of said junction, and an electrical connection to one of said contacts comprising a conductor adherent to said layer, said conductor extending from said one contact over said layer across said different portion of the junction, thereby providing electrical connections to both of the closely spaced contacts.

2. A semiconductor device comprising a body of extrinsic semiconductor having a surface, said body containing adjacent P-type and N-type regions, one overlying the other, with a junction therebetween extending to said surface and there completely encircling said overlying region, the underlying one of said regions extending to said surface and there surrounding said junction, a first metal contact adherent to said surface in ohmic electrical connection with said overlying region, an insulating layer consisting essentially of oxide of said semiconductor united with said surface and extending across said junction, a metal strip adherent to said layer, said strip being electrically connected to said first contact and extending therefrom over said layer across said junction, and a second metal contact adherent to said surface in ohmic electrical connection with said underlying region, said second contact substantially encircling said junction from one side of said strip to the other.

3. A semiconductor device comprising a body of extrinsic semiconductor having a surface, said body containing adjacent P-type and N-type regions with a dished junction therebetween having a substantially circular edge at said surface, a discoid metal contact adherent to said surface wholly within and substantially concentric with said edge, a C-shaped metal contact adherent to said surface and substantially concentric with said discoid contact, said C-shaped contact being wholly outside of and substantially encircling said edge, said C-shaped contact having two ends defining a gap therebetween, an insulating layer consisting of oxide of said semiconductor on said surface extending through said gap and across said junction, and a metal strip over and adherent to said layer extending through said gap and across said junction to said discoid contact, said contacts being in direct electrical connection with respective ones of said regions, and said metal strip being in direct electrical connection with said discoid contact but spaced and insulated from the ends of said C-shaped contact.

4. A diffused junction transistor comprising a body of extrinsic silicon having a surface, said body containing adjacent base and emitter regions, with a discoid emitter junction therebetween having a substantially circular edge at said surface encircling said emitter region, a discoid metal contact to said emitter region adherent to said surface wholly within said edge, a C-shaped metal contact to said base region adherent to said surface and substantially encircling said edge, said C-shaped contact having two ends defining a gap therebetween, an insulating layer of oxidized silicon on said surface, said layer being congenitally united with said body and extending across said junction, and a metal strip adherent to said layer, said strip extending from said discoid contact over said layer across said junction and between said ends forming an electrical connection to said emitter region.

5. A semiconductor device comprising a single-crystal body of semiconductor material having a surface, said body containing a high-resistivity region and extrinsic P-type and extrinsic N-type regions with a P–N junction therebetween extending to said surface, a metal contact to one of said extrinsic regions adherent to said surface, an insulating layer consisting essentially of oxide of said material on said surface, said layer being congenitally united with said body and extending across said junction, and an electrical connection to said contact comprising a metal strip adherent to said layer, said strip extending from said contact over said layer across said junction, said high-resistivity region underlying a portion of said strip, reducing the shunt capacitance between said strip and said body.

6. A semiconductor device comprising a body of semiconductor having a surface, said body containing adjacent P-type and N-type regions, one overlying the other, with a junction therebetween extending to said surface, a first metal contact adherent to said surface in electrical connection to said overlying region, a second metal contact in electrical connection with the underlying one of said regions, an insulating layer consisting essentially of oxide of said semiconductor on said surface, said layer being congenitally united with said body and extending across said junction, an electrical connection to said first contact comprising a metal strip adherent to said layer, said strip extending from said first contact over said layer across said junction, and circuit means for applying between said strip and second contact a D.C. voltage of the polarity that reverse-biases said junction, so that said junction acts as a capacitor connected between said strip and said second contact.

7. A semiconductor device comprising a body of extrinsic semiconductor having a surface, said body containing adjacent, first, second and third regions, one overlying the other, P-type and N-type alternately, with a first, dished, P–N junction between said first and second regions having an edge extending to said surface and there surrounding said first region, and a second, dished, P–N junction between said second and third regions extending to said surface and there surrounding said second region, a first metal contact adherent to said surface in electrical connection with said first region, a second metal contact adherent to said surface in electrical connection with said second region, a third metal contact in electrical connection with said third region, an insulating layer consisting essentially of an oxide of said semiconductor on said surface, said layer being congenitally united with said body and extending across both of said junctions, an electrical connection to said first contact comprising a first metal strip adherent to said layer, said first strip extending from said first contact over said layer across both of said junctions, and an electrical connection to said second contact comprising a second metal strip adherent to said layer, said second strip extending from said second contact over said layer across said second junction.

8. A semiconductor device as in claim 7, wherein said second contact is a C-shaped metal strip substantially encircling said first junction, and said third contact is a larger C-shaped metal strip adherent to said surface and substantially encircling said second junction.

9. A semiconductor device comprising a body of extrinsic semiconductor having a surface, said body containing a plurality of dished, P–N junctions each having an edge extending to said surface and there surrounding and defining an enclosed region of said semiconductor, a plurality of metal contacts adherent to said surface in electrical connection with respective ones of said enclosed regions, an insulating layer consisting essentially of oxide of said semiconductor on said surface, said layer being congentially united with said body and extending across a plurality of said junctions, and electrical interconnections between said contacts comprising metal strips adherent to said layer and extending over said layer across a plurality of said junctions.

10. A semiconductor device comprising a body of extrinsic semiconductor having a surface, said body containing adjacent P-type and N-type regions with a dished junction therebetween, said junction having an edge that extends to said surface and there forms an elongated, closed figure, first and second contacts in the form of parallel metal strips adherent to said surface, said first contact being wholly within and said second contact wholly without said edge of the junction, an insulating layer consisting of oxide of said semiconductor on said surface and extending across said junction, and a metal strip adherent to said insulating layer and extending thereover across said junction to connect physically and electrically with said first contact.

References Cited in the file of this patent

UNITED STATES PATENTS

| | | |
|---|---|---|
| 2,813,326 | Liebowitz | Nov. 19, 1957 |
| 2,836,878 | Shepard | June 3, 1958 |
| 2,842,723 | Koch et al. | July 8, 1958 |
| 2,849,664 | Beale | Aug. 26, 1958 |